United States Patent
Haynes et al.

(10) Patent No.: US 8,005,907 B2
(45) Date of Patent: Aug. 23, 2011

(54) SELECTIVELY MARKING EMAIL AS PARTIALLY REVIEWED

(75) Inventors: Thomas R. Haynes, Apex, NC (US); Lin Sun, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 298 days.

(21) Appl. No.: 12/121,547

(22) Filed: May 15, 2008

(65) Prior Publication Data

US 2009/0287779 A1  Nov. 19, 2009

(51) Int. Cl.
*G06F 15/16* (2006.01)
(52) U.S. Cl. ........... 709/206; 709/204; 709/205; 710/18
(58) Field of Classification Search .................. 709/206, 709/205, 204; 710/18
See application file for complete search history.

(56) References Cited

U.S. PATENT DOCUMENTS

| | | | |
|---|---|---|---|
| 6,230,204 B1* | 5/2001 | Fleming, III | 709/229 |
| 2006/0031300 A1* | 2/2006 | Kock et al. | 709/206 |
| 2007/0299923 A1* | 12/2007 | Skelly et al. | 709/206 |
| 2008/0114849 A1* | 5/2008 | Yuyama | 709/206 |
| 2009/0099992 A1* | 4/2009 | Horvitz | 706/46 |
| 2009/0100154 A1* | 4/2009 | Stevenson et al. | 709/220 |
| 2009/0106370 A1* | 4/2009 | Dreyfus et al. | 709/206 |
| 2009/0213435 A1* | 8/2009 | Cohen | 358/402 |
| 2009/0234727 A1* | 9/2009 | Petty | 705/14 |
| 2009/0259745 A1* | 10/2009 | Lee | 709/224 |
| 2010/0005149 A1* | 1/2010 | Yu | 709/206 |

\* cited by examiner

*Primary Examiner* — Wing F Chan
*Assistant Examiner* — Kostas Katsikis
(74) *Attorney, Agent, or Firm* — DeLisio Gilliam, PLLC

(57) ABSTRACT

An extent to which a user has reviewed an email is estimated, and a review value is assigned to the email based upon the estimated extent of review. A visual indicator associated with the email is displayed, wherein the appearance of the visual indicator is determined at least by the review value. In an exemplary embodiment, the email contains one or more recipient email addresses, wherein each recipient email address is associated with a recipient review value. In the exemplary embodiment, a visual indicator is displayed corresponding to the recipient review value associated with each recipient email address.

21 Claims, 2 Drawing Sheets

SELECTIVELY MARKING EMAIL AS PARTIALLY REVIEWED

BACKGROUND OF THE INVENTION

In most email systems there are two states for an email in the inbox; unopened (unread) or opened (read). However, these two binary states do not provide any nuance about such issues as the degree to which an email has actually been read or scrutinized. For instance, if a new email is opened (or previewed) quickly, the user may have only obtained a vague notion of subject, content, other people involved, etc., yet the email will be shown to have been opened. This can mislead the user, for example, by causing them to believe that the email has been reviewed when the user reopens his or her inbox at a later time.

Furthermore, users of conventional email systems have access to very little information about an email they have sent to one or more users after the email is sent. Using "read receipts," the recipient of such an email can send a notification to the sender notifying them that they have opened the email. However, such a read receipt suffers from similar problems as those discussed above regarding binary email states, namely that the sender lacks information about the degree to which the sent email has been reviewed.

BRIEF SUMMARY OF THE INVENTION

Methods, systems, and computer readable media for selectively marking email as partially reviewed are described. An extent to which a user has reviewed an email is estimated, and a review value is assigned to the email based upon the estimated extent of review. A visual indicator associated with the email is displayed, wherein the appearance of the visual indicator is determined at least by the review value.

In an exemplary embodiment, the email contains one or more recipient email addresses, wherein each recipient email address is associated with a recipient review value. In the exemplary embodiment, a visual indicator is displayed corresponding to the recipient review value associated with each recipient email address.

DETAILED DESCRIPTION OF THE INVENTION

Processes, systems, and computer readable media to selectively mark email as partially reviewed are described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
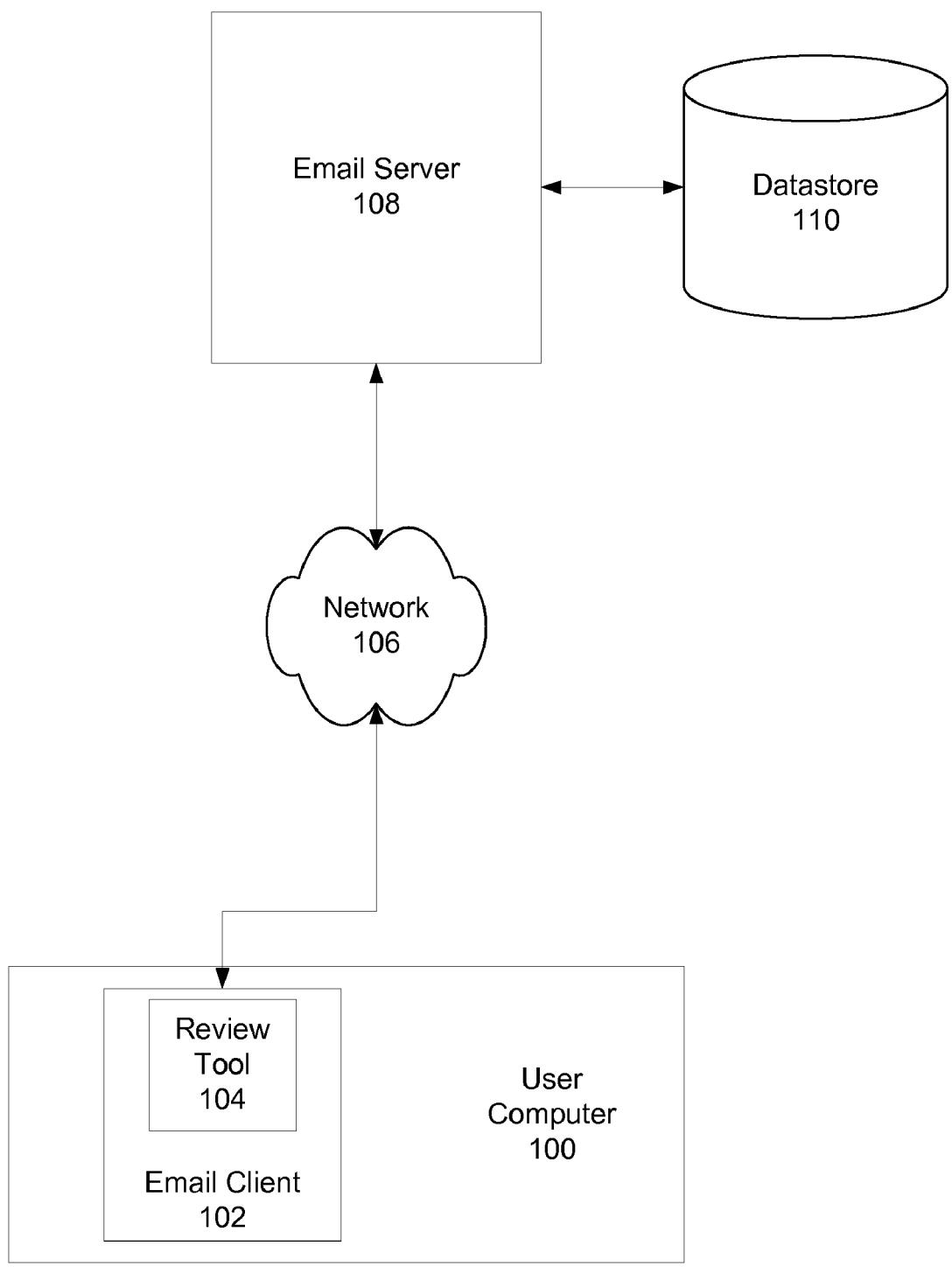
FIG. 1 illustrates an exemplary embodiment of a system for selectively marking email as partially reviewed.

FIG. 1 illustrates an exemplary embodiment of a system for selectively marking email as partially reviewed. The system can include a user computer 100, an email client 102, a review tool 104, a network 106, an email server 108, and an email datastore 110. Email can be stored on the email datastore 110, and can be transferred to the email client 102 when a request is made by the email client 102. The transfer can take place over the network 106, which can be any conventional wired or wireless network connection. While the review tool 104 is shown as a component of the email client 102 on the user computer 100, this configuration is not required. In an exemplary embodiment, the review tool 104 can be located on the email server 108. As described below, the system shown in FIG. 1 can be used to selectively mark email as partially read, meaning that it can indicate the degree to which the email has been reviewed without being limited to binary email states.

Figures 2, 3:
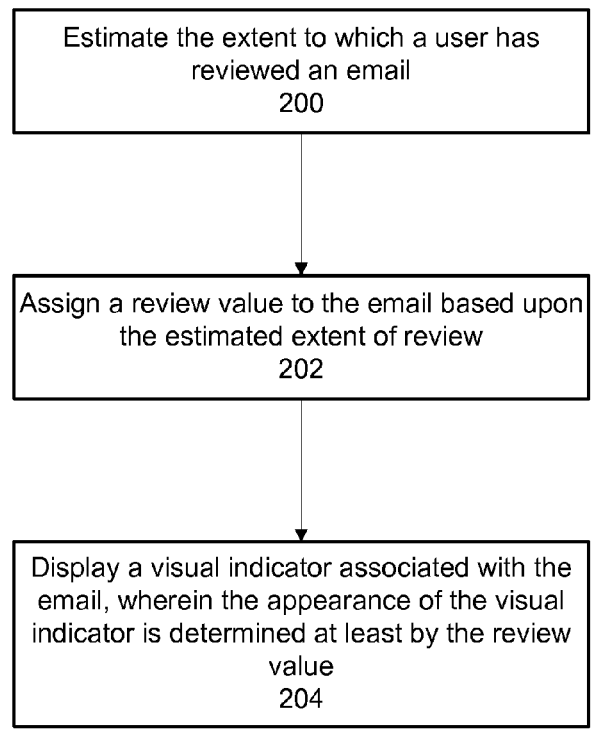
FIG. 2 illustrates an exemplary embodiment of a process to selectively mark email as partially reviewed.
FIG. 3 is a diagram showing one embodiment for the visual indicator.

FIG. 2 illustrates an exemplary embodiment of a process to selectively mark email as partially reviewed. An extent to which a user has reviewed an email is estimated (block 200), and a review value is assigned to the email based upon the estimated extent of review (block 202). The method of estimation can be any analysis (e.g., based upon a set of rules or algorithm) of user behavior related to review of the email. The review value can correspond to a quantitative measure of the estimated extent of review, which can be expressed as a fraction or percentage of a value corresponding to a full review of the email. The estimating the extent to which a user has reviewed an email can be based, in an exemplary embodiment, on user interaction with a preview pane and/or the open email.

For example, the estimating the extent to which a user has reviewed an email can include monitoring an open time for the email, and the review value can be based at least upon the open time divided by a predetermined time period associated with the email. The open time can be the time period for which the email has been open, or can correspond to the time period for which the email has been visible to the user in a preview pane. The open time can be measured, for example, by the review tool 104. In another embodiment, the open time can be obtained by the review tool 104 by retrieving the time of day that the email is opened from the operating system on the user computer 100, or by utilizing a timer function provided by the operating system on the user computer 100.

In an alternative embodiment, wherein the email includes a body (e.g., the lines of text above a signature block) and the body has a length, the estimating the extent to which a user has reviewed an email can include determining the amount the user has scrolled the body of the email, and the review value can be based at least upon the amount the user has scrolled the body of the email divided by the length of the body of the email. The amount the user has scrolled the body of the email can be determined, for example by having the review tool 104 monitor the number of lines of text that have appeared in the visible range. In such an example, the length of the body of the email can be expressed as a total number of lines occupied by text and/or by graphics.

Multiple analyses of user behavior can be used, alone or in combination, to assign a review value to the email. In addition to the above analyses of user behavior, other factors can be used to affect the review value of the email. In an exemplary embodiment, the email can include an email type, and the review value can be based at least upon the email type. The email type can be derived, for example, by the folder that the user elects to have the email sent. For example, if the email is deduced to be an advertisement, then a reduced period of open time can cause the review value to indicate that the email has been fully read. Likewise, if the email is deduced to be work-related, then the period of open time corresponding to a full reading can be increased.

In an exemplary embodiment, wherein the email comprises a sender email address (e.g., the email address in the "from" field), the review value can be based upon at least a value associated with the sender email address. Similar to the email type example above, if an email is from a sender designated by the user, the period of open time corresponding to a full reading could be increased. For instance, if the sender is a VIP, such as the user's manager, then the email would have to be open longer to be considered completely read. In another embodiment, an email from a user-designated sender could be assigned a review value corresponding to an unread state when it is viewable in a preview pane, regardless of the open time in the preview pane or the number of lines viewable to the user.

In another embodiment, the review value can be based upon a value associated with a user input. For example, while the user is viewing the email, the user could manually mark it as being fully reviewed, if desired, by using a shortcut key (e.g., Alt+R). This could cause the review value to be assigned the value corresponding to a full review. Also, for example, the review tool 104 could be configured to mark the email as fully reviewed (i.e., cause the review value to be assigned the value corresponding to a full review) when the user replies to the email.

A visual indicator associated with the email is displayed, wherein the appearance of the visual indicator is determined at least by the review value (block 204). The visual indicator can convey the degree to which the email has been reviewed, and can take the form, for example, of a colored graphic, or a numerical display of the review value. The visual indicator can be located within the inbox (e.g., in a cell within the row for the email in the inbox table), the preview pane, and/or the opened email. In an exemplary embodiment, the user can choose one or more locations for the one or more visual locators to appear.

FIG. 3 is a diagram showing one embodiment for the visual indicator. In an exemplary embodiment, the visual indicator 300 can be a colored graphic (e.g., an icon, or a shape). In this example, the visual indicator 300 is shown as a circle having colors for the review states, where a blue circle might indicate completely read, a clear or white circle might indicate unread, and a half-filled circle might indicate partially read. The binary states of unreviewed and fully reviewed can be associated with different colors. Based upon the review value, a color along the spectrum from unreviewed to fully reviewed can be applied. For example, if "white" is associated with an unreviewed email, and "red" is associated with a fully reviewed email, then a set of paler shades of red or pink along a gradation could be employed to indicate the degree to which the email has been partially reviewed.

In an exemplary embodiment, a review tool such as the review tool 104 could be applied by the user computer 100 not only to emails, but also to web links accessed by a web browser, or to documents stored on the user computer 100.

The visual indicator 300 can dynamically provide the user with the degree to which the email has been reviewed in some embodiments. For example, as the email is open (i.e., is accumulating open time), or as the user is scrolling through the text of the email, the visual indicator can be updated by the review tool 104 to reflect progress towards a review value indicating a full review.

If the email is closed when the review value indicates that the email has been partially reviewed, the review value for the email can be stored. This can inform the user that the email has been partially reviewed in a previous session. The review value for the email can be stored on the user computer 100 and/or on the datastore 110.

In embodiments where the email includes one or more recipient email addresses (e.g., email addresses in the "to," "cc," and/or "bcc" fields), wherein each recipient email address is associated with a recipient review value, a visual indicator can be displayed corresponding to the recipient review value associated with each recipient email address. In such embodiments, the user can examine an email he or she has sent or received, and obtain estimates of the degree to which the email has been reviewed by the recipients. The recipient review value can be stored, for example, in datastore 110, and can be transferred to the email client 102 upon startup of the email client 102, for example. The visual indicator for each recipient email address can function as described hereinabove.

In an exemplary embodiment, the ability to view the degree of recipient review can be configurable (e.g., can be activated or deactivated, or selectively applied to certain email addresses), which can be advantageous because not all recipients prefer to allow other individuals with access to the email to easily know the degree of their review. This can provide a useful 'social computing' enhancement to existing email collaboration, and in an exemplary embodiment could complement other data already provided as aspects to email lists, such as whether the recipients are 'online' or not, and their instant messenger status.

In an exemplary embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program ("storage medium"), communicate, propagate, or transport the program ("propagation medium") for use by or in connection with the instruction execution system, apparatus, or device.

The medium can be an electronic, magnetic, optical, electromagnetic, infrared, or semiconductor system (or apparatus or device) ("storage medium") or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

A method and system to selectively mark email as partially reviewed has been described. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method to selectively mark email as partially reviewed, comprising:
    estimating an extent to which a user has partially reviewed an email, wherein said estimating the extent to which the user has partially reviewed the email comprises monitoring an open time for the email and determining a review value that represents an estimated portion of the email that has been partially reviewed, wherein said determining the review value comprises computing the open time divided by a predetermined time period associated with the email;
    assigning the review value to the email; and
    displaying a visual indicator associated with the email, wherein the appearance of the visual indicator is determined at least by the review value.

2. The method of claim 1 wherein the email comprises an email type, wherein the review value is based at least upon the email type.

3. The method of claim 1 wherein the email comprises a sender email address, wherein the review value is based upon at least a value associated with the sender email address.

4. The method of claim 1 wherein the review value is assigned a value associated with a user input.

5. The method of claim 1 wherein the visual indicator is a colored graphic.

6. The method of claim 1 wherein the visual indicator is a numerical display of the review value.

7. The method of claim 1 wherein the estimating the extent to which a user has reviewed an email is based on user interaction with a preview pane.

8. The method of claim 1 wherein the visual indicator is located within an inbox.

9. The method of claim 1 wherein the visual indicator is located within a preview pane.

10. The method of claim 1 wherein the email comprises one or more recipient email addresses, wherein each recipient email address is associated with a recipient review value, further comprising displaying a visual indicator corresponding to the recipient review value associated with each recipient email address.

11. The method of claim 1, wherein the review value comprises one of a fraction value and percentage value.

12. A data processing system comprising:
    a processor;
    a network adapter coupled with the processor, the network adapter operable to receive an e-mail from another data processing system; and
    a review tool for selectively marking email as partially reviewed, wherein the review tool is configured to:
        estimate an extent to which a user has partially reviewed an email, wherein the review tool configured to estimate the extent to which the user has partially reviewed the email comprises the review tool configured to monitor an open time for the email and determine a review value that represents an estimated portion of the email that has been partially reviewed, wherein said determining the review value comprises computing the open time divided by a predetermined time period associated with the email;
        assign the review value to the email; and
        display a visual indicator associated with the email, wherein the appearance of the visual indicator is determined at least by the review value.

13. The data processing system of claim 12, wherein the review value comprises one of a fraction value and a percentage value.

14. An executable software product stored on a computer-readable non-transitory storage medium containing program instructions for selectively marking email as partially reviewed, the program instructions for:
    estimating an extent to which a user has partially reviewed an email, wherein the program instructions for estimating the extent to which the user has partially reviewed the email comprise program instructions for monitoring an open time for the email and determining a review value that represents an estimated portion of the email that has been partially reviewed, and wherein the program instructions for determining the review value comprise program instructions for computing the open time divided by a predetermined time period associated with the email;
    assigning the review value to the email; and
    displaying a visual indicator associated with the email, wherein the appearance of the visual indicator is determined at least by the review value.

15. The executable software product of claim 14 wherein the email comprises a sender email address, wherein the review value is based upon at least a value associated with the sender email address.

16. The executable software product of claim 14 wherein the review value is assigned a value associated with a user input.

17. The executable software product of claim 14 wherein the visual indicator is a colored graphic.

18. The executable software product of claim 14 wherein the the extent to which the user has partially reviewed the email is based on user interaction with a preview pane.

19. The executable software product of claim 14 wherein the visual indicator is located within an inbox.

20. The executable software product of claim 14 wherein the visual indicator is located within a preview pane.

21. The executable software product of claim 14 wherein the email comprises one or more recipient email addresses, wherein each recipient email address is associated with a recipient review value, further comprising program instructions for displaying a visual indicator corresponding to the recipient review value associated with each recipient email address.

* * * * *